(12) United States Patent
Thörn

(10) Patent No.: US 8,244,068 B2
(45) Date of Patent: Aug. 14, 2012

(54) DEVICE AND METHOD FOR ADJUSTING ORIENTATION OF A DATA REPRESENTATION DISPLAYED ON A DISPLAY

(75) Inventor: Ola Thörn, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 954 days.

(21) Appl. No.: 11/692,443

(22) Filed: Mar. 28, 2007

(65) Prior Publication Data

US 2008/0239131 A1    Oct. 2, 2008

(51) Int. Cl.
*G06K 9/36* (2006.01)
*G06K 9/32* (2006.01)

(52) U.S. Cl. .................. 382/289; 382/296; 382/297

(58) Field of Classification Search .............. 382/296, 382/289
See application file for complete search history.

(56) References Cited

U.S. PATENT DOCUMENTS

| 5,900,909 | A | 5/1999 | Parulski | |
|---|---|---|---|---|
| 5,933,527 | A | 8/1999 | Ishikawa | |
| 2003/0016883 | A1 | 1/2003 | Baron | |
| 2004/0017506 | A1 | 1/2004 | Livingston | |
| 2004/0076341 | A1* | 4/2004 | Dolan | 382/289 |
| 2005/0044510 | A1* | 2/2005 | Yi | 715/864 |
| 2005/0104848 | A1* | 5/2005 | Yamaguchi et al. | 345/156 |
| 2006/0222264 | A1* | 10/2006 | Guitarte Perez et al. | 382/296 |
| 2006/0227103 | A1* | 10/2006 | Koo et al. | 345/156 |
| 2007/0296820 | A1* | 12/2007 | Lonn | 348/207.99 |

FOREIGN PATENT DOCUMENTS

| EP | 0 884 905 A2 | 12/1998 |
|---|---|---|
| EP | 0 884 905 A3 | 12/1998 |
| FR | 2 861 524 | 4/2005 |
| JP | 2005-100084 | 4/2005 |
| JP | 2005-202477 A | 7/2005 |
| JP | 2005-266061 A | 9/2005 |
| WO | WO 01/31893 A1 | 5/2001 |
| WO | WO 02/37179 A2 | 5/2002 |
| WO | WO 02/37179 A3 | 5/2002 |

OTHER PUBLICATIONS

International Search Report corresponding to PCT/EP2007/058865, mailed Dec. 19, 2007.
Written Opinion corresponding to PCT/EP2007/058865, mailed Dec. 19, 2007.
A.W. "Face and Feature Finding for a Face Recognition System" In proceedings of Audio- and Video based Biometric Person Authentication '99 pp. 154-159, Washington D.C. USA, Mar. 22-24, 1999.
Rocio Diaz de Leon, Luis Enrique Sucar, "Human Silhouette Recognition with Fourier Descriptors," icpr. p. 3713, 15th International Conference on Pattern Recognition (ICPR '00)—vol. 3, 2000.
Pending U.S. Appl. No. 11/425,395, filed Jun. 21, 2006, application attached.
Office Action for corresponding Japanese Application No. 2010-500083 dated Feb. 3, 2012.

* cited by examiner

*Primary Examiner* — Anand Bhatnagar
*Assistant Examiner* — Soo Park
(74) *Attorney, Agent, or Firm* — Renner, Otto, Boisselle & Sklar LLP

(57) ABSTRACT

An electronic device, preferably in the form of a mobile phone, comprising a support structure and a camera carried by the support structure. An orientation detector is connected to the camera. The orientation detector is configured to identify images features in an image captured by the camera, such as the eyes and the mouth of the user, and to determine rotation orientation of the image relative to a reference orientation. A display carried by the support structure is configured to display a data representation, and further to display this data representation in an orientation dependent on the determined rotation orientation. This way a data presentation can e.g. be displayed in a portrait orientation or in a landscape orientation in dependence of which rotational orientation the device is currently held in when the data representation is viewed by a user of the electronic device.

28 Claims, 3 Drawing Sheets

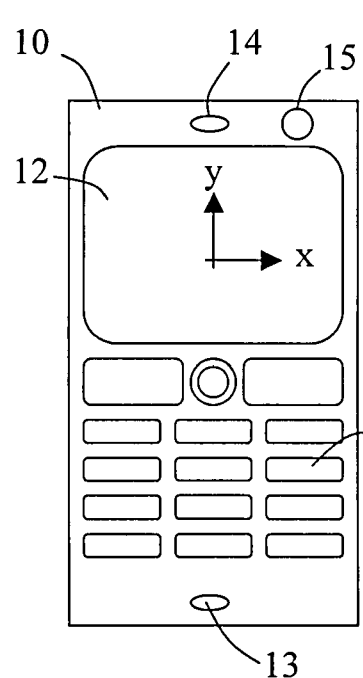
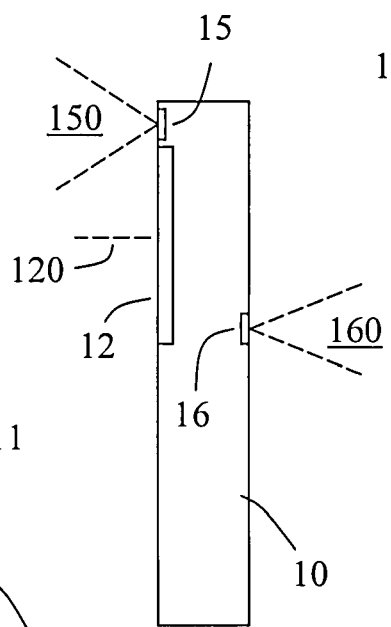
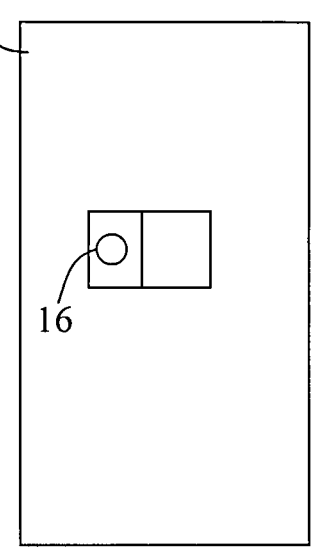
Fig. 1  Fig. 2  Fig. 3
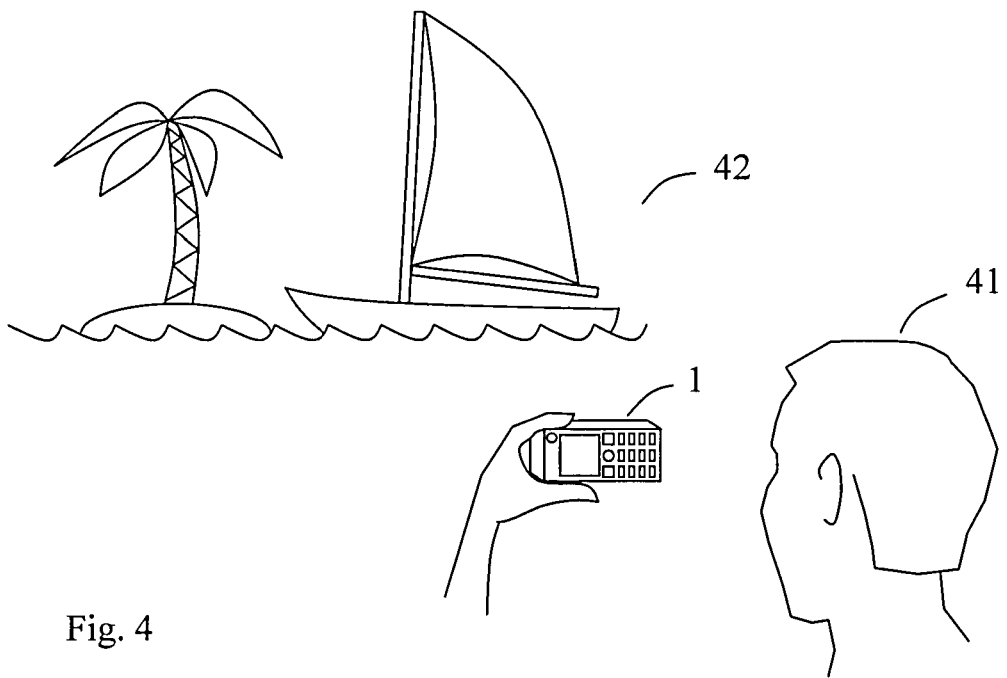
Fig. 4

DEVICE AND METHOD FOR ADJUSTING ORIENTATION OF A DATA REPRESENTATION DISPLAYED ON A DISPLAY

TECHNICAL FIELD

The present invention relates in general to electronic devices and methods for presenting data or information on a display of such electronic devices. More particularly, the invention relates to a solution for adjusting rotation orientation of a data representation that is displayed on the display of the electronic device, such that the data representation can be presented in the most appropriate orientation in dependence of the orientation of the electronic device.

BACKGROUND

State of the art portable electronic devices (e.g. mobile phones, portable media players or portable game consoles) are typically equipped with a user interface through which a user of such portable electronic device may interact with and operate the portable electronic device. The user interface typically includes a user input interface for inputting data or information and commands to the electronic device. The user interface typically also includes an output user interface, e.g. in the form of a display, for displaying or rendering a data representation. As used in this specification, the term "data representation" is intended to refer to the visual appearance of any data or information displayed or rendered on the display. The data representation may e.g. include text and/or a visual image. As such, the data representation may comprise, but is not limited to, menu lists, digital photo images captured by a camera, SMS messages, MMS messages, browsed web pages, TV broadcasts, etc. Consequently, users of state of the art portable electronic devices can use the displays of such devices to view, inter alia, text, visual images, TV broadcasts, videos, etc.

The terms "portrait" and "landscape" are often used to refer to different orientations of a data representation—whether it is oriented vertically or horizontally when displayed on the display of the portable electronic device. Portrait orientation is where the height of the displayed data representation is greater than the width. On the contrary, landscape orientation is where the width of the displayed data representation is greater than the height, and may e.g. be used for data representations that need to be wider than what is offered by portrait orientation. The state of the art displays of portable electronic devices may be relatively small in size and, hence, viewing of data representations on such displays may sometimes be rather awkward to the user. The user is therefore often free to choose to display data representations either in the horizontal "landscape" orientation or in the vertical "portrait" orientation. For example, it is often considered appropriate to present a data representation such as a TV broadcast in a "landscape" orientation, whereas it may be considered more appropriate to display a data representation such as a menu list in a "portrait" orientation of the mobile phone. Consequently, in many state of the art mobile phones the user has an option to use a software application to choose between a landscape orientation and a portrait orientation in dependence of the rotation orientation of the mobile phone. However, this is a manual operation and can be quite time-consuming. Time-consuming operations may be annoying to some users.

Consequently, there appears to be a need for a more automatic means and method for orientation adjustment of a data representation that is displayed or rendered on a display of an electronic device, such that the data representation can be displayed in an appropriate orientation on the display in dependence of the rotation orientation of the electronic device. The orientation adjustment of the data representation should preferably be achieved with only little or, preferably, no user intervention.

A possible solution could be to equip the portable electronic device with mercury-filled switches, photo-interrupter type switches or gravity-sensitive switches to detect or sense the rotational orientation of the portable electronic device. Based on the detected or sensed orientation of the portable electronic device, adjustment of a data representation that is displayed or rendered on a display of an electronic device could then be performed, such that the data representation could be displayed in an appropriate orientation on the display in dependence of the orientation of the electronic device. Inclusion of physical auxiliary means for orientation detection, such as the above-mentioned switches, has been suggested in the field of digital cameras; see e.g. U.S. Pat. No. 5,900,909 to Parulski et al. or US 2004/0017506 A1 to Livingston. However, any inclusion of physical auxiliary means for orientation detection, such as switches, also involves increased cost and requires some space within the portable electronic device in question. Therefore, any inclusion of physical auxiliary means for orientation detection, such as switches, might be disadvantageous, especially in small-sized portable electronic devices such as mobile phones, portable media players or handheld game consoles.

SUMMARY OF THE INVENTION

With the above and the following description in mind, then, an aspect of the present invention is to provide improved means and methods, which seek to mitigate, alleviate or eliminate one or more of the above-identified deficiencies in the art and disadvantages singly or in any combination. Another aspect of the present invention is to provide improved means and methods for orientation adjustment of a data representation to be displayed on a display of an electronic device, e.g. a mobile phone.

According to an embodiment of the invention, an electronic device comprises a support structure; a camera carried by the support structure; an orientation detector connected to the camera, the orientation detector being configured to identify images features in an image captured by the camera, and to determine rotation orientation of the captured image relative to a reference orientation; and a display carried by the support structure, the display being configured to display a data representation, and to display the data representation in an orientation dependent on the determined rotation orientation.

The camera may be configured to capture images continuously.

The orientation detector may be configured to identify three or more features from an image captured by the camera.

The orientation detector may be configured to identify image features of a human user.

The image features may include facial features.
The image features may include an eye.
The image features may include a mouth.
The image features may include a chin.
The image features may include an eyebrow.
The image features may include a silhouette of the human user.
The data representation may include data.
The data may include text and/or a visual image.

The orientation detector may be configured to detect the orientation of a captured image relative to a vertical orientation and a horizontal orientation, and to determine that the support structure is either vertically oriented or horizontally orientated dependent on which of these orientations matches closest with the captured image of the camera.

The electronic device may be a device from the group comprising: a portable radio communication equipment, a mobile radio terminal, a mobile telephone, a cellular telephone, a pager, a communicator, an electronic organizer such as a PDA, a smart phone, a digital camera, a digital media player (e.g. an iPod™ available from Apple Inc.), a portable game console (e.g. a Sony PSP available from Sony Computer Entertainment), a Global Positioning System (GPS) device or a computer (e.g. a PC).

According to another embodiment of the invention, a method for adjusting a data representation orientation on a display of an electronic device, comprises:

capturing an image using a camera carried by a support structure of the electronic device;

identifying image features in the image captured by the camera, determining rotation orientation of the image captured by the camera relative to a reference orientation; and displaying the data representation on a display of the electronic device in an orientation dependent on the determined rotation orientation.

The method may comprise capturing images continuously.

The method may comprise aiming the camera towards a user of the device.

The method may comprise identifying three or more features from an image captured by the camera.

The method may comprise identifying image features of a human user.

The image features may include facial features.

The image features may include an eye.

The image features may include a mouth.

The image features may include a chin.

The image features may include an eyebrow.

The image features may include a silhouette of the human user.

The data representation may include data.

The data may include text and/or a visual image.

The method may comprise:

detecting the orientation of an image captured by the camera relative to a vertical orientation and a horizontal orientation;

determining that the support structure is either vertically oriented or horizontally orientated dependent on which of these orientations matches closest with the captured image of the camera.

Some embodiments of the invention provide for a solution where a data presentation can be displayed on the display of the electronic device in a portrait orientation or in a landscape orientation in dependence of which rotational orientation the device is currently held in when the data representation is viewed by a user of the electronic device. It is an advantage with some embodiments of the invention that they can be implemented in an electronic device, which already includes a camera for any other purpose anyway. In a best mode of the invention known to date, some embodiments of the invention can be implemented in a mobile phone equipped with a camera for video telephony purposes. An advantage offered by the embodiments of the invention when applied in such a mobile phone is that it makes use of existing components to provide added value to the customer.

BRIEF DESCRIPTION OF THE DRAWINGS

Further objects, features and advantages of the invention will appear from the following detailed description of embodiments of the invention, wherein embodiments of the invention will be described in more detail with reference to the accompanying drawings, in which:

FIG. 1 schematically illustrates a front view of an electronic device in the form of a mobile phone, where the front side includes a display and a camera;

FIG. 2 illustrates a side view of the device of FIG. 1;

FIG. 3 schematically illustrates a rear view of the device of FIGS. 1 and 2, where the rear side may include a further camera;

FIG. 4 schematically illustrates a scenario where a user interacts with and operates an electronic device of FIGS. 1-3 by holding the device rotated approximately 90° from the orientation depicted in FIG. 1;

DETAILED DESCRIPTION OF EMBODIMENTS

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Furthermore, the terminology used in this specification is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The present description relates to the field of electronic devices including a digital camera. A preferred embodiment of the invention relates to a portable communication device configured for video telephony, such as a 3G mobile phone. The invention is particularly suitable for mobile phones, but is as such equally applicable to digital devices which do not include radio communication capabilities. However, for the sake of clarity and simplicity, most embodiments outlined herein are related to mobile phones. Preferred embodiments will now be described with reference to the accompanying drawings.

Figure 11:
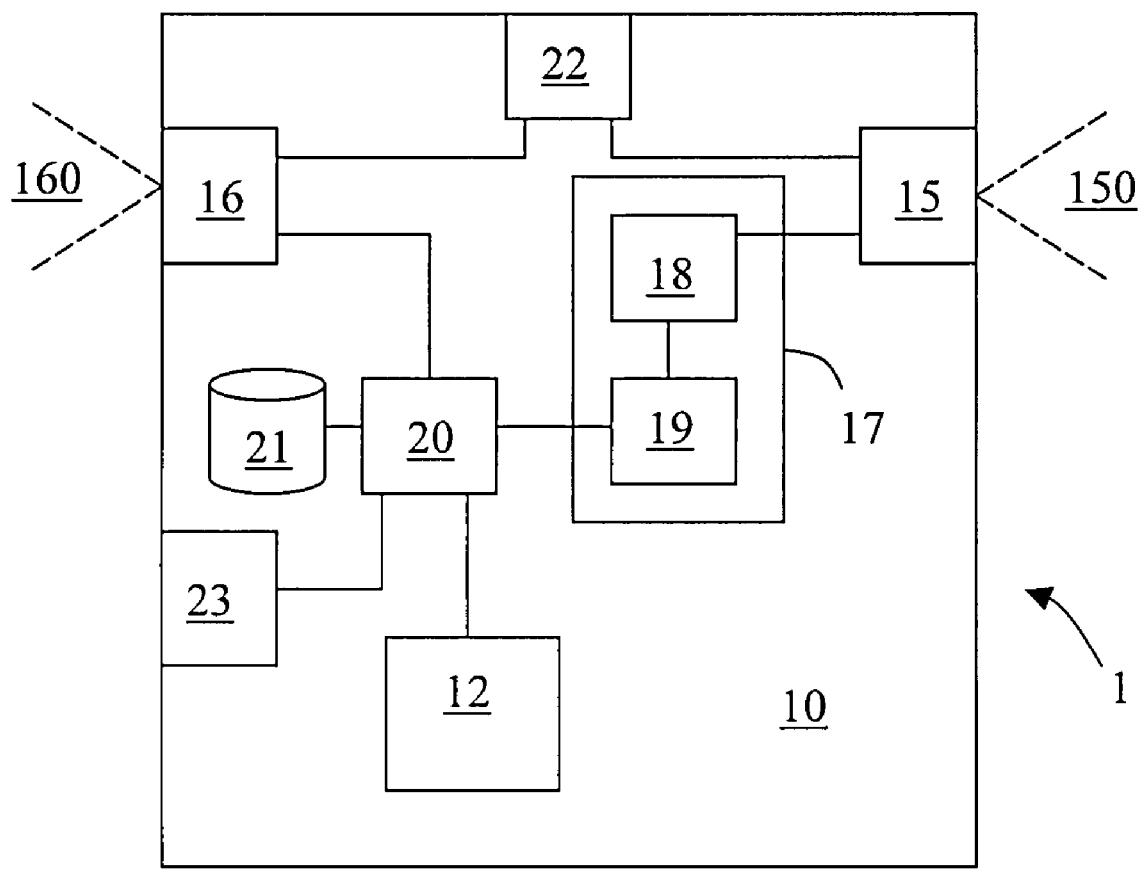
FIG. 11 schematically illustrates a block diagram of functional features of an electronic device in accordance with an embodiment of the invention.

A portable communication device 1 configured in accordance with an embodiment of the invention is shown from three different angles in FIGS. 1-3, and in the form of a block diagram in FIG. 11. The portable radio communication device 1 may e.g. be a mobile telephone as depicted in the figures. The portable radio communication device 1 comprises a support structure 10 including a housing and a chassis, arranged to support other elements of the device. A user interface includes a keypad or keyboard 11 and a display 12. Typically, the device 1 also includes an audio interface including a microphone 13 and a speaker 14, as well as radio transceiver circuitry and antenna 23, even though these elements are not of importance for the invention and can be dispensed with if the invention is employed in another electronic device, e.g. in a portable electronic organizer such as a PDA. Normally a battery (not shown) is also included. The specific function and design of the device 1 as a communication device is known to persons skilled in the art, and will therefore not be described in any greater detail herein. It should also be noted that the list of features and elements included in the device 1 is in no way exhaustive. On the contrary, while the device 1 shown and described represents only one possible embodiment, it may well comprise further features and elements providing other functions.

However, apart from the elements outlined above, the device 1 also includes a camera 15, which may be positioned adjacent to display 12 as depicted in FIG. 1, and aimed such that its field of view (FOV) 150 is likely to cover a user watching display 12. Consequently, the camera 15 is aimed in a direction substantially common with a normal viewing direction of the display 12. The device 1 may additionally include a further camera 16. This further camera 16 is of little I5 importance for the invention and can, hence, be dispensed with in some embodiments of the invention. From the discussion hereinbelow, it will be clear to the reader that the camera 15, which is positioned adjacent to display 12 in FIG. 1, is sufficient for the purpose of orientation adjustment in accordance with the embodiments of the present invention. If the device 1 nevertheless includes the further camera 16, this camera 16 should preferably be aimed such that its FOV 160 does not overlap the FOV 150 of the camera 15. Preferably, the two cameras 15 and 16 are aimed at substantially opposite directions, but they may optionally be directed approximately 90° to each other. It is in fact not essential that the two cameras 15 and 16 have fixed line of sights, the further camera 16 could indeed e.g. be rotatable in a socket in support structure 10 to some extent.

In FIG. 1 a vertical axis y and a horizontal axis x are defined for the device 1. More specifically, the y axis represents the longitudinal direction of the device 1. If a user interacts with and operates with the device 1 when the device 1 is held as shown in FIG. 1, i.e. with the y axis held vertically, a data representation on the display device 12 is generally displayed in a portrait orientation. FIG. 4 illustrates a different scenario, where a user 41 interacts with and operates the device 1 in another orientation. In this position, the device 1 has been rotated approximately 90° counter clockwise, such that horizontal axis x of device 1 now points vertically upwards. In this position, a prior art device would as a default rule not compensate for this approximately 90° counter clockwise rotation of the device 1 when presenting the data representation on the display 12. Instead, a prior art device would as a default rule present the data representation on the display 12 in exactly the same rotation as it does when the device 1 is held as shown in FIG. 1, i.e. in the portrait orientation. However, in most cases it would be more appropriate for the user if the data were displayed in a landscape orientation when the device 1 has the orientation as depicted in FIG. 4.

However, a target of the present invention is to facilitate presentation of a data representation on display 12 (or another display), such that the displayed data representation on the display 12 is presented on the display 12 in the most appropriate rotation orientation in dependence of the orientation of the device 1. In accordance with an embodiment of the invention, the camera 15 is used to determine the orientation of the device 1 when capturing images. This is particularly useful in mobile phones 1 that support video telephony, where a video telephony camera (VTC) 15 is included. The VTC 15 is normally directed towards the face of the user 41 and is configured to capture images either continuously, or as an alternative only upon activation of an image recording trigger. The present orientation of device 1 is then determined by analyzing the image captured by the camera 15, and the determined orientation is subsequently used to manipulate a displayed data representation on the display device 12, so as to rotate the data representation to either a landscape or a portrait orientation in dependence of the determined orientation of device 1. The device 1 is arranged to present a data representation on the display 12 in a portrait orientation, when the device 1 has the position as depicted in FIG. 1. Further, the device 1 is arranged to present a data representation on the display 12 in a landscape orientation when the device 1 has the position as depicted in FIG. 4.

The present orientation of device 1 is determined by identifying at least two features in the image captured by the camera 15. Preferably, three features in the face of the user 41 are identified. These features preferably include the eyes and mouth of the user. Alternatively, though, other features may be identified if they are better suited for the purpose, such as the chin, the nose, the ears, or the hairline. Three features are preferably identified in the image, in order to determine in which direction the device 1 is rotated. With only two features, it may become too difficult to discriminate between clockwise and counter-clockwise rotation. Numerous software-based processes for facial feature identification and recognition purposes have been presented in papers and in real products, and several patents have been granted within this field. As a mere example, A. W. Senior presented *"Face and Feature Finding for a Face Recognition System"* In proceedings of Audio- and Video-based Biometric Person Authentication '99, pp. 154-159. Washington D.C. USA, Mar. 22-24, 1999. As another example, U.S. Pat. No. 5,933,527 to Ishikawa discloses a facial image processing method and apparatus, by means of which areas of facial features may be extracted, and coordinate data related to those areas can be extracted.

An embodiment of a process for data representation rotation orientation adjustment in accordance with some embodiments of the invention will now be described with reference to the drawings, based on the scenario illustrated in FIG. 4.

Figure 5:
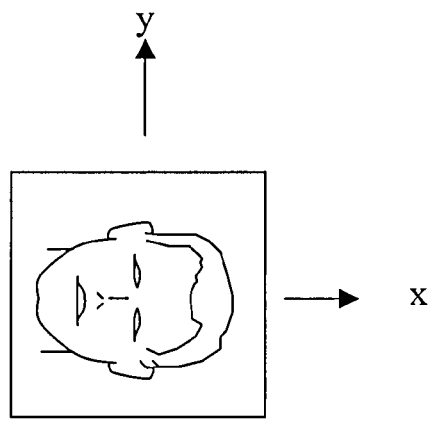
FIG. 5 schematically illustrates an image of the user of the device, captured by the camera shown in FIG. 1.
Figure 6:
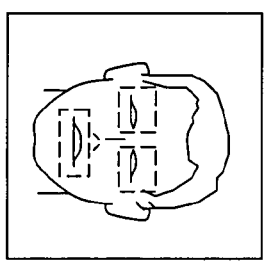
FIG. 6 schematically illustrates how selected features of the image of the user, such as the eyes and mouth, are identified by an image identifying function in the electronic device.

When the device 1 has the rotational orientation as depicted in FIG. 4, an image of the user 41 can be captured by means of the camera 15, this image being shown in FIG. 5. This image is preferably captured continuously by the camera 15. However, as an alternative it could be captured upon activation of an image recording trigger 22. An image recording trigger 22, typically a push-button or the like, is therefore operatively connected to the camera 15, wherein activation of the trigger causes the camera 15 to record images within its FOV 150. The image of FIG. 5 is passed from camera 15 to an orientation detector 17. The orientation detector 17 is preferably realized by means of software executed by a processor device, but is indicated in FIG. 11 as a functional element for the sake of simplicity and easy understanding of the process as such. Orientation detector 17 comprises an image feature detector 18, operable to analyze the image received to identify images features in an image captured by the camera 15. This is illustrated in FIG. 6, where two eye portions and a mouth portion of the image have been detected and identified as eyes and mouth of the user.

Figure 7:
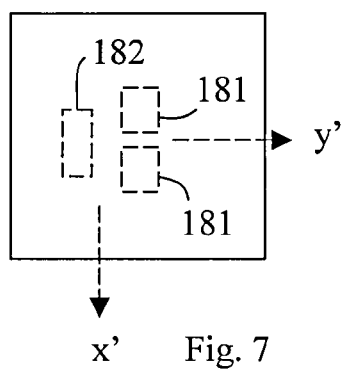
FIG. 7 illustrates how the identified features are associated with a normal vertical axis and horizontal axis of a face of a human user.

In FIG. 7, the image areas 181 representing the positions of the eyes, and 182 representing the position of the mouth, have been extracted from the captured image of the user. This does not mean that an image as shown in FIG. 7 must be generated, but that these are now the areas of interest in the captured image. Orientation detector 17 is preferably configured to detect facial image features, and is thereby configured to determine that a line passing through the eye portions 181 defines a baseline, whereas the position of mouth portion 182 relative to that baseline represents the lower part of the image. This way, a coordinate system for the captured image may be defined, where a horizontal image axis x' is parallel to the baseline, and a vertical image axis y' is orthogonal to the baseline, with the positive direction of the y' axis extending away from the position of the mouth area portion 182, as counted from the baseline.

Figure 8:
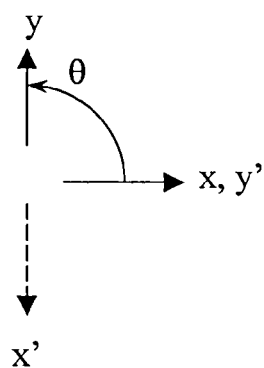
FIG. 8 schematically illustrates how the relative rotational orientation of the image is determined, compared to the orientation of the electronic device.

The orientation of the image captured by camera 15, in the image plane, is thereby determined in accordance with FIG. 7. In a calculator unit 19, the rotation orientation of the image is then determined relative to a pre-stored reference orientation. For the illustrated embodiment, where the features to be identified are facial features, the reference position is preferably a vertical orientation of the face, which in FIG. 8 is represented by a vertical axis y and a horizontal axis x, corresponding to the vertical and horizontal axes of the device 1 as such. Calculator unit 19 is configured to calculate the rotational difference between the coordinate system of axis x', y' and the coordinate system of axis x, y, to determine a rotation angle θ.

In a preferred embodiment, the calculator unit 19 is configured to disregard deviations from a perfectly vertical or horizontal orientation of the device 1. In fact, any inclination from these two orthogonal orientations may indeed be up to the artistic freedom of the user. Furthermore, it cannot be guaranteed that the user holds his or her head in a perfectly upright position. For these reasons, calculator unit 19 is preferably configured to output only rotation angles θ in steps of 90°, in order to produce an angle θ usable for transforming a data representation displayed on the display 12 between landscape and portrait orientations, and to make distinction between up and down. The orientation detector is thereby configured to detect the orientation of a captured image relative to a vertical orientation and a horizontal orientation, and to determine that the support structure of the device 1 is either vertically oriented or horizontally orientated dependent on which of these orientations matches closest with the captured image of the camera 15. As an example, should calculator unit 19 determine that the actual angle between y' and y is less than ±45°, the output value of θ is 0 (zero). In the same manner:

If 45°<θ<135°, then the output value of θ is set to 90°.
If 135°<θ<225°, then the output value of θ is set to 180°.
If 225°<θ<315°, then the output value of θ is set to 270°, i.e. −90°.

Figure 9:
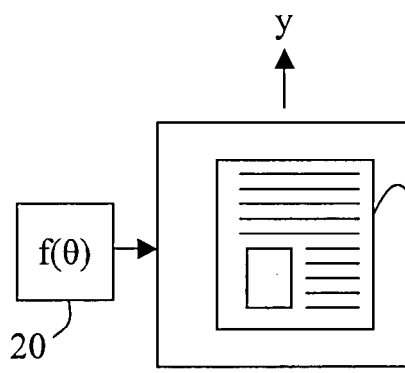
FIG. 9 schematically illustrates how an operator function is applied to the data representation displayed on the display of the electronic device, which operator function is dependent on the determined rotational orientation.
Figure 10:
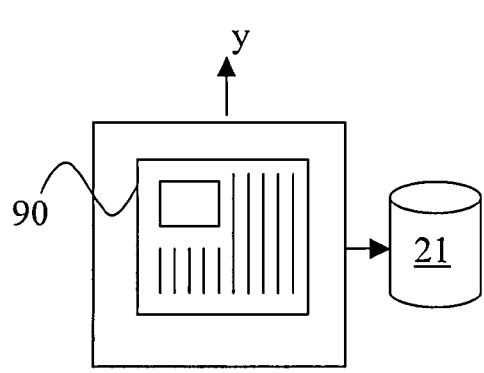
FIG. 10 schematically illustrates how the data representation displayed on the display has been adjusted by rotation.

Orientation detector 17 outputs the output value of angle θ to microprocessor 20. As illustrated in FIG. 9, microprocessor 20 thereby processes the data representation 90 (which in this illustrative example includes text as well as a visual image) displayed on the display 12 using an operator function f(θ), which logistically involves the operation of rotating the data representation 90 presented on the display device 12 by the received angle θ. The result is illustrated in FIG. 10, from which it is evident that the data representation 90 has been rotated by approximately 90°, as detected by orientation detector 17.

Information of the angle θ may be stored in a memory 21 in the device 1. Needless to say, the memory 21 does not have to be permanently attached to the device 1, it may e.g. just as well be arranged on an insertable IC memory card. Storing previously calculated rotation angles inter alia has the advantage that if the device 1, for any reason, would fail to perform a valid face recognition later, it is possible to use the last known rotation angle.

The embodiment of the process for image rotation orientation adjustment described in conjunction with FIG. 4 utilizes of facial feature identification and recognition for determining the rotational orientation of device 1. However, it should be appreciated that it is also possible to utilize, as an addition to or as an alternative, so-called human silhouette recognition. In human silhouette recognition, the silhouette of a human user (as opposed to facial features of the human user) is identified and recognized. The silhouette of the human user may include the silhouette of face of the human user. Processes for human silhouette identification and recognition purposes have been presented in papers. As a mere example, Rocio Diaz de Leon, Luis Enrique Sucar, "Human Silhouette Recognition with Fourier Descriptors," icpr, p. 3713, 15th International Conference on Pattern Recognition (ICPR'00)—Volume 3, 2000. Human silhouette recognition is particularly advantageous in strong sunlight conditions, when it might be difficult to identify facial features of a user. Instead, it may suffice to identify the silhouette of user with the aid of human silhouette identification and recognition technique.

Further, as another example of feature identification and recognition for determining the rotational orientation of device 1, Optical Character Recognition (OCR) could be used. The embodiment of the process for image rotation orientation adjustment described in conjunction with FIG. 4 utilizes of facial feature identification and recognition for determining the rotational orientation of device 1. However, it should be appreciated that it is also possible to utilize, as an addition to or as an alternative, Optical Character Recognition (OCR) for determining the rotational direction of device 1 by e.g. determining the rotational direction of images of handwritten or typewritten text.

The presented solution is different from existing solutions inter alia in that it assumes the use of a camera as the orientation sensing device. A device 1 according to the present invention is therefore particularly suitable if the device 1 already includes a camera 15 for any other purpose anyway. A best mode of the invention known to date is therefore to employ the invention in a mobile phone equipped with a camera 15 for video telephony purposes. The advantage offered by the invention when applied in such a mobile phone 1 is that it makes use of existing components to provide added value to the customer.

In the case the device 1 includes both cameras 15 and 16, respectively, the device 1 may be combined with a solution for adjusting image rotation orientation of images captured by the further camera 16, such that images captured by the further camera 16 may be stored in a common orientation regardless of how the device 1 is oriented when the image was captured by the further camera 16. Such a solution is disclosed in U.S. application Ser. No. 11/425,395 filed on Jun. 21, 2006. To this end the device 1 would, hence, comprise, a support structure; a camera 15 carried by the support structure; a further camera 16 carried by the support structure; an orientation detector connected to the camera 15, configured to identify images features in an image captured by the camera 15, and to determine rotation orientation of the image relative to a reference orientation; and a data storing device configured to store image data of images captured by the further camera 16 in an orientation dependent on determined rotation orientation. The data storing device may be configured to store image data in the orientation as captured by the further camera 16, or rotated in one more steps of 90° as determined by the orientation detector.

Various embodiments of the present invention have been outlined above and specific examples have been described in detail with reference to the appended drawings. It should be noted, though, that the invention is not limited to these specific examples, but may in fact be modified within the scope defined by the appended claims.

I claim:

1. An electronic device, comprising:
   a support structure;
   a camera carried by the support structure;
   a display carried by the support structure;
   a data storing device; and wherein the camera is aimed in a direction substantially common with a normal viewing direction of the display to capture an image of a user viewing the display,
   an orientation detector connected to the camera and configured to:
      identify features in an image of a user viewing the display captured by the camera aimed in a direction substantially common with a normal viewing direction of the display to capture an image of a user viewing the display,
      determine rotation orientation of the image of the user captured by the camera relative to a reference orientation defined by a reference coordinate system of the electronic device,
      place the image features in an image coordinate system,
      determine a rotation angle ($\theta$) between the image coordinate system and the reference coordinate system,
      use the rotation angle ($\theta$) to determine a rotation orientation of the image of the user captured by the camera relative to a reference orientation,
      determine a display orientation of the data representation on the display based on the determined rotation orientation;
   wherein the rotation angle ($\theta$) is stored in the data storing device such that the rotation angle ($\theta$) is available for subsequent use in determining the display orientation; and
   wherein the orientation detector is further configured to use the stored rotation angle ($\theta$) to determine the display orientation in the event that the orientation detector is unable to determine the rotation angle ($\theta$).

2. The device of claim 1, wherein the camera is configured to capture images continuously.

3. The device of claim 1, wherein the orientation detector is configured to identify three or more features from an image captured by the camera.

4. The device of claim 1, wherein the orientation detector is configured to identify image features of a human user.

5. The device of claim 4, wherein the image features includes facial features.

6. The device of claim 4, wherein the image features includes an eye.

7. The device of claim 4, wherein the image features includes a mouth.

8. The device of claim 4, wherein the image features includes a chin.

9. The device of claim 4, wherein the image features includes an eyebrow.

10. The device of claim 4, wherein the image features includes a silhouette of the human user.

11. The device of claim 1, wherein the data representation includes data.

12. The device of claim 11, wherein the data includes text and/or a visual image.

13. The device of claim 1, wherein the orientation detector is configured to detect the orientation of a captured image relative to a vertical orientation and a horizontal orientation, and to determine that the support structure is either vertically oriented or horizontally orientated dependent on which of these orientations matches closest with the captured image of the camera.

14. The device of claim 1, wherein the device is a device from the group comprising: a portable radio communication equipment, a mobile radio terminal, a mobile telephone, a cellular telephone, a pager, a communicator, an electronic organizer, a smart phone, a digital camera, a digital media player, a portable game console, a GPS device or a computer.

15. A method for adjusting a data representation orientation on a display of an electronic device, comprising:
   capturing an image using a camera carried by a support structure of the electronic device, wherein the camera is aimed in a direction substantially common with a normal viewing direction of the display to capture an image of a user viewing the display;
   identifying image features in the image captured by the camera;
   placing the image features in an image coordinate system;
   determining a rotation angle ($\theta$) between the image coordinate system and a reference coordinate system;
   using the rotation angle ($\theta$) to determine a rotation orientation of the image captured by the camera relative to a reference orientation;
   determining a display orientation of the data representation on the display based on the determined rotation orientation;
   displaying the data representation on the display in the determined display orientation;
   storing the rotation angle ($\theta$) in a data storing device such that the rotation angle ($\theta$); and
   using the previously stored rotation angle ($\theta$) to determine the display orientation in the event that the orientation detector is unable to determine the rotation angle ($\theta$).

16. The method of claim 15, comprising:
capturing images continuously.

17. The method of claim 15, comprising:
aiming the camera towards a user of the device.

18. The method of claim 15, comprising:
identifying three or more features from an image captured by the camera.

19. The method of claim 15, comprising:
identifying image features of a human user.

20. The method of claim 19, wherein the image features includes facial features.

21. The method of claim 19, wherein the image features includes an eye.

22. The method of claim 19, wherein the image features includes a mouth.

23. The method of claim 19, wherein the image features includes a chin.

24. The method of claim 19, wherein the image features includes an eyebrow.

25. The method of claim 19, wherein the image features includes a silhouette of the human user.

26. The method of claim 15, wherein the data representation includes data.

27. The method of claim 26, wherein the data includes text and/or a visual image.

28. The method of claim 15, comprising:
detecting the orientation of an image captured by the camera relative to a vertical orientation and a horizontal orientation;
determining that the support structure is either vertically oriented or horizontally orientated dependent on which of these orientations matches closest with the captured image of the camera.

* * * * *